US005471543A

United States Patent [19]
Ng et al.

[11] Patent Number: 5,471,543
[45] Date of Patent: Nov. 28, 1995

[54] MIXED SCREEN FREQUENCIES WITH IMAGE SEGMENTATION

[75] Inventors: Yee S. Ng, Fairport; Hwai-Tzuu Tai, Rochester, both of N.Y.

[73] Assignee: Eastman Kodak Company, Rochester, N.Y.

[21] Appl. No.: 877,353

[22] Filed: Apr. 30, 1992

Related U.S. Application Data

[63] Continuation of Ser. No. 542,993, Jun. 25, 1990, abandoned.
[51] Int. Cl.⁶ .................................................. G06K 9/00
[52] U.S. Cl. .................................... 382/173; 358/456
[58] Field of Search ............................ 358/453, 456, 358/457, 459, 462, 464, 298; 382/9, 50

[56] References Cited

U.S. PATENT DOCUMENTS

| | | | |
|---|---|---|---|
| 4,194,221 | 3/1980 | Stoffel | 382/56 |
| 4,196,453 | 4/1980 | Warren | 358/298 |
| 4,413,286 | 11/1983 | Boston | 358/283 |
| 4,547,812 | 10/1985 | Waller et al. | 358/459 |
| 4,595,956 | 6/1986 | Kawamura et al. | 358/298 |
| 4,647,962 | 3/1987 | Rosen et al. | 358/456 |
| 4,668,995 | 5/1987 | Chen et al. | 358/459 |
| 4,809,063 | 2/1989 | Moriguchi et al. | 358/298 |
| 4,942,479 | 7/1990 | Kanno | 358/453 |

OTHER PUBLICATIONS

Dana Ballard and Christopher Brown, Computer Vision, Prentice Hall, 1982, pp. 116–117, 149–165.

Primary Examiner—Leo H. Boudreau
Attorney, Agent, or Firm—Norman Rushefsky

[57] ABSTRACT

Apparatus for producing a screen halftone image provides for segmentation of images by optical density, busyness, segment size, and/or propensity to contouring; and for printing the segments which have high optical density, are more busy, and/or have a lesser propensity to contouring at a relatively high screen frequency; and for printing segments which have low optical density, are less busy, and/or have a greater propensity to contouring at a relatively low screen frequency. Both screen frequencies are printed at the same apparent screen angle to reduce texturing. Small segments are assigned the same screen frequency as the surrounding segment.

24 Claims, 6 Drawing Sheets

1/400 INCH

MIXED SCREEN FREQUENCIES WITH IMAGE SEGMENTATION

This is a continuation of application Ser. No. 07/542,993, filed Jun. 25, 1990, now abandoned.

BACKGROUND OF THE INVENTION

1. Technical Field

This invention relates generally to encoding pictorial imagery for reproduction on binary display and/or printing systems, and more particularly to maximizing the number of gray levels for low density segments of an image while reducing screen texturing and increasing apparent resolution in high density segments of the image.

2. Background Art

Binary displays and printers are capable of making a mark, usually in the form of a dot, of a given, uniform size and at a specified resolution, measured in terms such as marks per unit length (typically dots per inch). It has been common to place the marks according to a variety of geometrical patterns such that a group of marks when seen by the eye gives a rendition of an intermediate color tone between the color of the background (usually white paper stock) and total coverage, or solid density.

Continuous tone images are simulated by organizing groups of sub-elements into j×k matrix halftone cells, where j and k are positive integers. The halftone cells have gray level capabilities equal to the number of sub-elements in the cell plus one.

Halftone image processing algorithms are evaluated in part by their capability to deliver a complete gray scale at normal viewing distances. The capability of a particular process to reproduce high frequency renditions (fine detail) with high contrast modulation makes that procedure superior to one which reproduces such fine detail with lesser or no output contrast.

Another measure of image processing algorithm merit is the tendency to produce visual details in the output image that are not part of the original image, but are the result of the image processing algorithm. Such details are called artifacts, and include grain, false contours, and false textures. False textures are artificial changes in the image texture which occur when input gray levels vary slowly and smoothly and the output generates an artificial boundary between the textural patterns for one gray level and the textural patterns for the next gray level. False contours are the result of gray scale quantization steps which are sufficiently large to create a visible density step when the input image is truly a smooth, gradual variation from one to the other.

Briefly, several of the commonly used processing algorithms include fixed level thresholding, adaptive thresholding, orthographic tone scale fonts, and electronic screening. The present invention is concerned with the latter, electronic screening. The factors relating to the screen which determine the type of image to be reproduced include optical density screen values, screen frequency, and screen angle.

Figure 1:
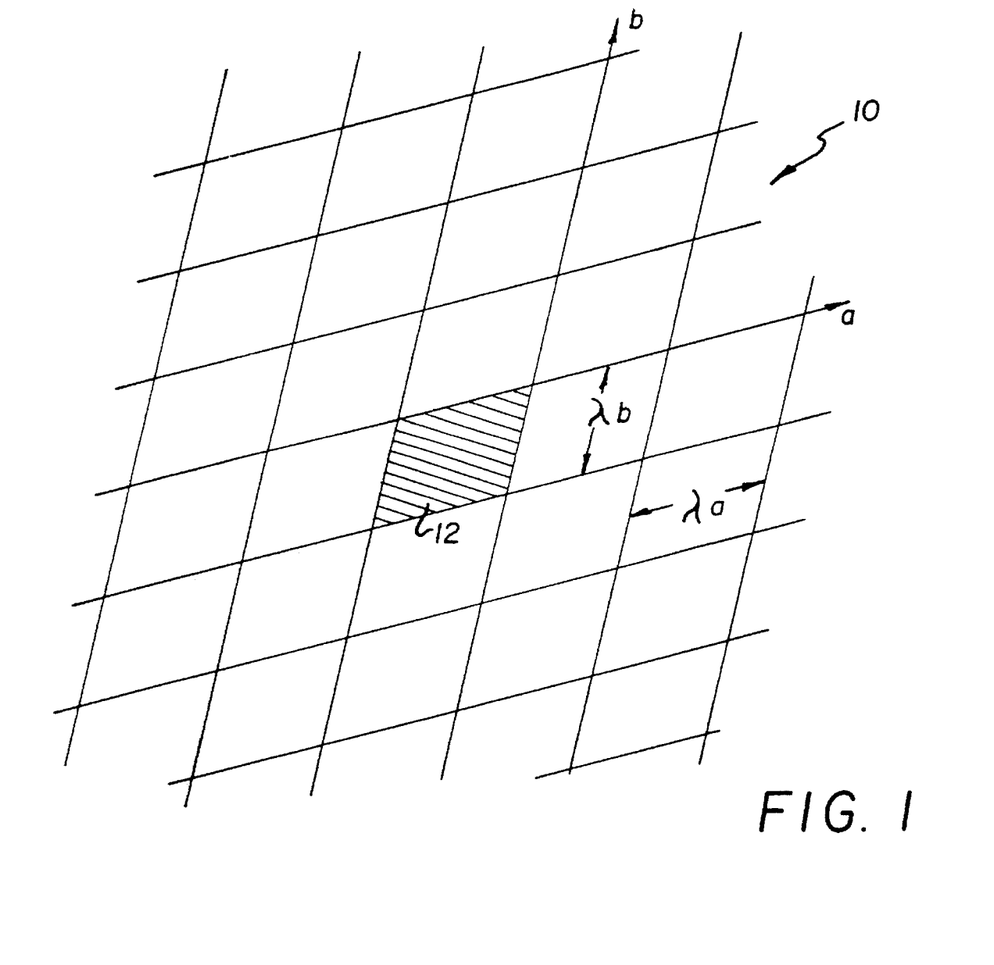
FIG. 1 is a diagrammatic representation of a digital screen illustrating the principal of screen frequencies.

There are many formats for electronic halftone cells at various screen angles and screen frequencies. FIG. 1, which is reproduced in part from U.S. Pat. No. 4,4.13,286, shows a screen 10 generated by the repetition of a screen cell 12 in directions "a" and "b". Cell 12 is included between two adjacent parallel lines in direction "a" and two adjacent parallel lines in the direction "b". In FIG. 1, distances $\lambda_a$ and $\lambda_b$ are the spatial frequencies of screen 10 in directions "a" and "b", respectively.

It is generally recognized that the perceived quality of a halftone image is directly proportional to the number of gray levels available, and that a greater number of gray levels are attainable as the screen frequency $\lambda$ decreases. Further, lower screen frequencies reduce grain and density contouring.

However, reduction of screen frequency is limited by the increased appearance of screen texture and by a lower apparent resolution of the system. Accordingly, prior art systems were designed as a compromise, trading off increased gray scale levels, reduced grain, and reduced countouring for increased texture and decreased resolution.

DISCLOSURE OF INVENTION

It is an object of the present invention to increase gray scale levels, reduce grain, and reduce countouring without increasing texture or decreasing resolution.

It is another object of the present invention to segment images according to characteristics such as optical density, busyness, segment size, and/or propensity to contouring; and to provide an increased number of gray scale levels in segments such as those which have low optical density, are less busy, and/or have a greater propensity to contouring without decreasing the screen frequency in the other segments of the image.

It is still another object of the present invention to increase the screen frequency in segments such as those which have high optical density, are more busy, and/or have a lesser propensity to contouring without increasing grain or contouring in the other segments of the image.

It is yet another object of the present invention to increase the screen frequency in segments such as those which have high optical density, are more busy, and/or have a lesser propensity to contouring without increasing the screen frequency in low optical density segments of the image.

It is also an object of the present invention to provide a high screen frequency in segments such as those which have high optical density, are more busy, and/or have a lesser propensity to contouring and to provide a low screen frequency in segments such as those which have low optical density, are less busy, and/or have a greater propensity to contouring, with both screen frequencies being at the same apparent screen angle to reduce texturing.

It is a further object of the present invention to provide a high screen frequency in segments such as those which have high optical density, are more busy, and/or have a lesser propensity to contouring and to provide a low screen frequency in segments such as those which have low optical density, are less busy, and/or have a greater propensity to contouring, with further segmentation on the basis of size; small segments being assigned the same screen frequency as the surrounding segment.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 2:
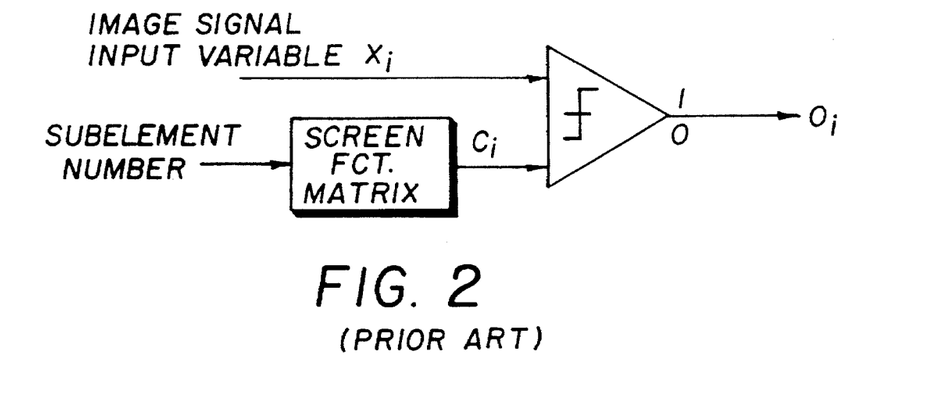
FIG. 2 is a schematic view of the electronic screening process known in the prior art.

FIG. 2 shows a schematic view of a conventional electronic screening process. Signal $X_i$ represents the lightness or gray level information at a pixel sampling point "i" of an image. Input signal $X_i$ of sample image picture elements is compared with a series of threshold values $C_i$ selected in sequential order from a look-up table of two-dimensional matrix values defined to be the halftone cell threshold set, and a print/no-print decision is made for each comparison. The series of threshold values and their arrangement within the threshold set determine the gray scale range, the frequency, angle, and other properties of the halftone pictorial image. Each threshold level $C_i$ is determined by a comparison j×k matrix. When the input signal $X_i$ exceeds the threshold level $C_i$, the corresponding sub-element is determined to have a print level or logic level "ONE". By comparing the input signal $X_i$ with the threshold levels, j×k output signals $O_i$ are produced. A density pattern consisting of a combination of j×k sub-elements is obtained by dividing each picture element into j×k sub-elements and systematically printing them or leaving them blank.

Figure 3:
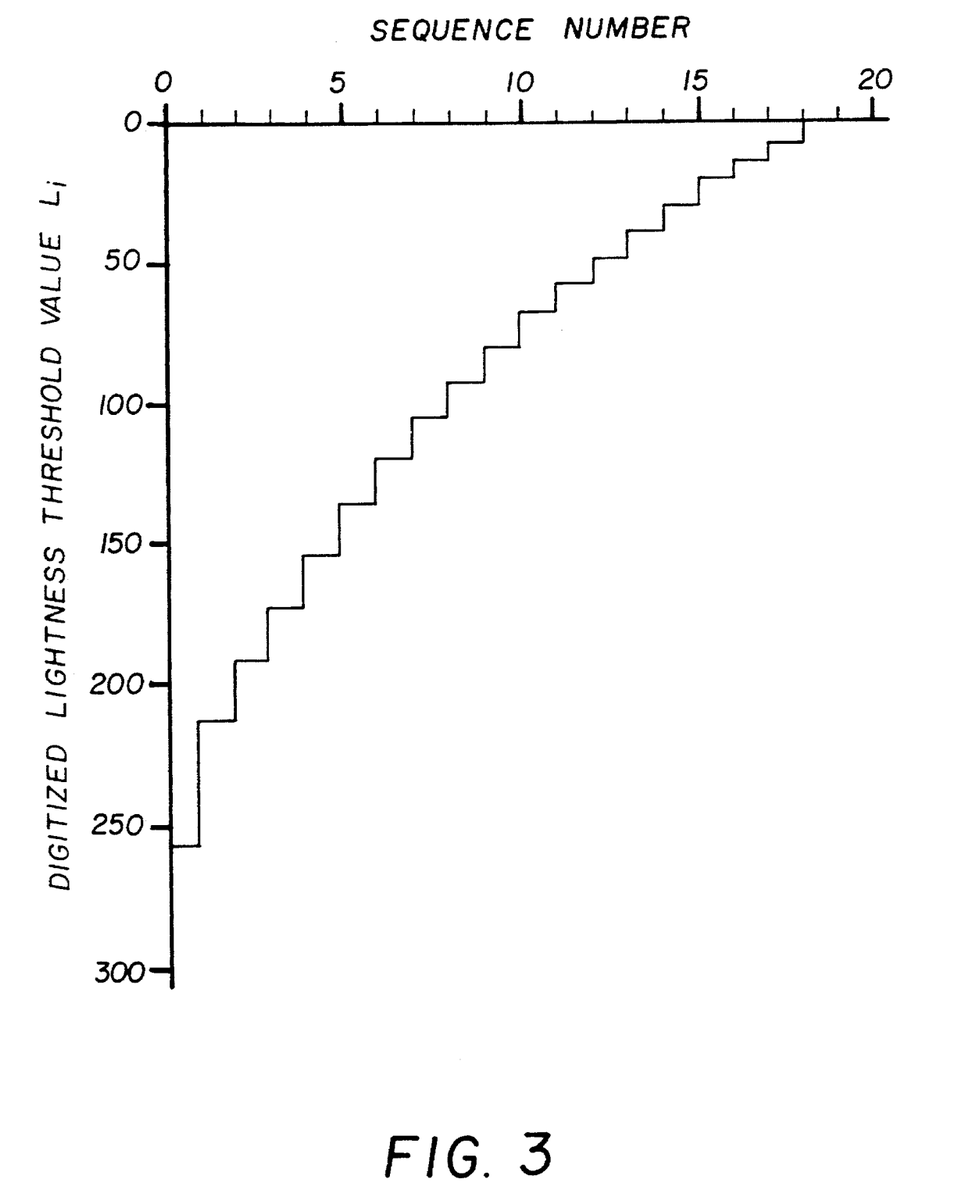
FIG. 3 is a plot of the apparent output lightness produced by the sequential activation of the sub-elements of FIG. 3.

FIG. 3 is a plot of the apparent output lightness threshold values "$L_i$" produced by the sequential activation of the sub-elements of FIG. 2 plotted against the sequence number of the halftone matrix cell, where:

$$L_i = 25.4(100R_i + 0.1)^{0.33} - 16$$

and $R_i$ is the input reflectance. As can be seen from FIG. 3, in a halftone system with limited numbers of addressable sub-elements per halftone cell, and if the threshold values are fixed in the output threshold matrix, there will be significant output density contouring in the low density (high lightness) region. If, for example, the input pixel lightness value at the sixth sequence number (threshold value=117) is at a value of 118, this output sub-element is not turned "ON". If the input pixel lightness value is at a value of 117, this output sub-element is turned "ON"; thereby creating an output density jump. This output density jump occurs when the input pixel lightness value is near a threshold value on the output threshold matrix, thereby creating density contouring in broad, flat field areas.

Figure 4:
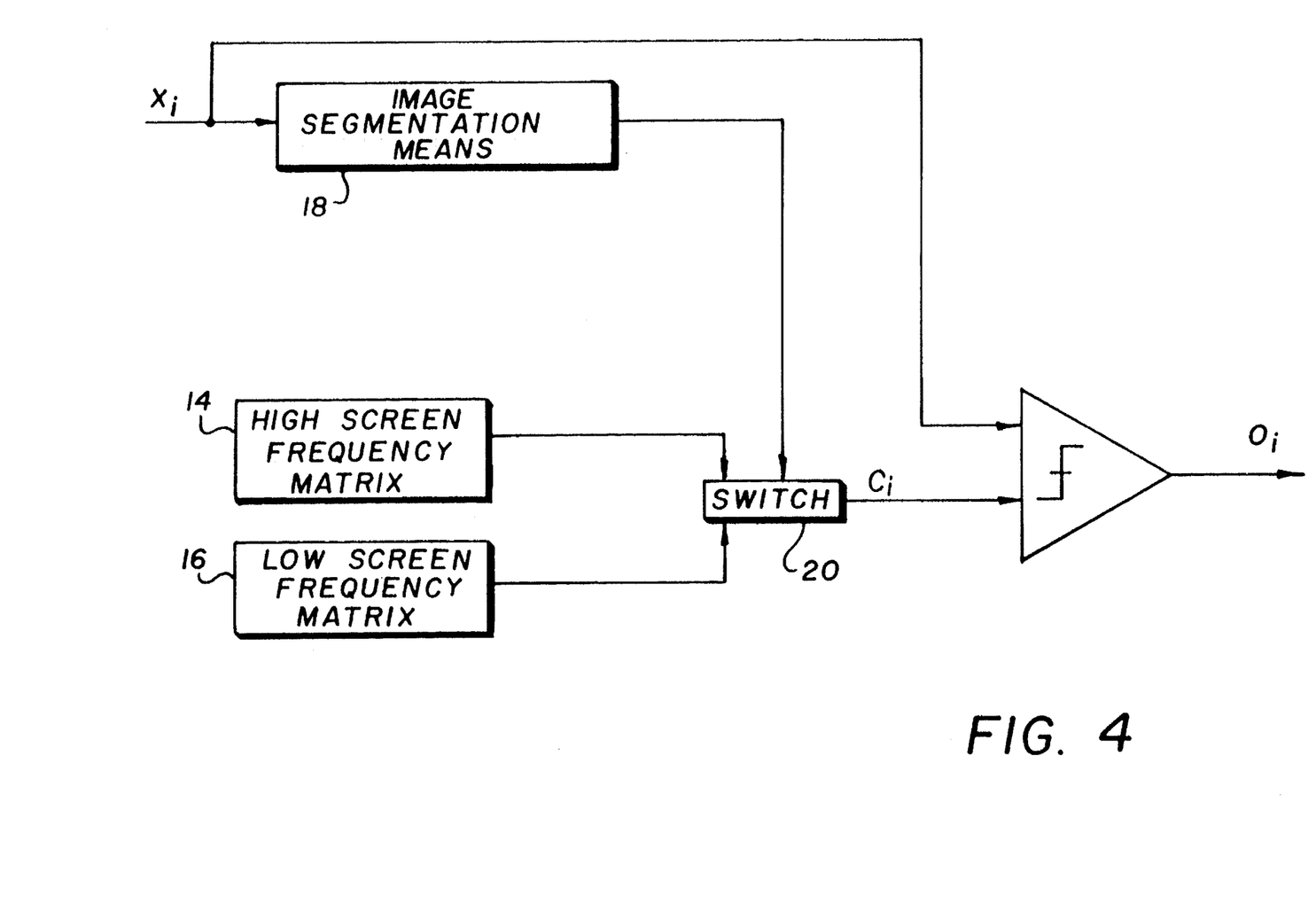
FIG. 4 is a schematic view of the electronic screening process according to a preferred embodiment of the present invention.

FIG. 4 is a schematic view of one embodiment of specific components, and the way those components are interconnected, for encoding an image for reproduction on binary display and/or printing systems to maximize the number of gray levels for low optical density segments of the image while reducing screen texturing and increasing apparent resolution in high optical density segments of the image. The electronic screening process provides means for switching between a high screen frequency matrix 14 and a low screen frequency matrix 16 according to the optical density of the image segment.

If the apparent screen angles of high screen frequency matrix 14 and low screen frequency matrix 16 are different, there will be an increase in false texture artifacts at less busy and low density image portions. Accordingly, it is a feature of the present invention that matrices 14 and 16 should preferably have the same apparent screen angles.

Signal $X_i$ represents the lightness or gray level information at a pixel sampling point "i" of an image. Signal $X_i$ is inputted to an image segmentation means 18. A variety of techniques and algorithms have been developed for computer-aided segmentation of images. In general, the image segmentation methods are classified into three classes: (1) feature thresholding and clustering, (2) edge or boundary formation, and (3) region formation.

Feature thresholding and clustering includes gray level thresholding used for segmentation of simple images with high contrast. In its most general form, thresholding is described as:

$S(x,y)=k$, if $T_{k-1} \leq f(x,y) \leq T_k$ where $k=0,1,\ldots,m$; $f(x,y)$ and $S(x,y)$ are the original gray value image and the segmented image, respectively; $(x,y)$ is the coordinate of a pixel; $(T_0 \ldots T_m)$ are the threshold values with $T_0$ equal to the minimum value and $T_m$ the maximum value; and m is the number of distinct levels assigned to the segmented image.

This approach can be viewed as clustering of pixels which have similar brightness values within certain thresholds. In general, two or more characteristic features may be used to form distinct clusters in a multidimensional feature space. Such clusters are then mapped back to the original spacial domain to produce a segmentation of the image.

Edge detection is another commonly used segmentation method which is based on the detection of discontinuity and outlines within an image, such as for example In gray level or texture. In general, an edge-detection/boundary-formation technique requires the application of an edge detector to every pixel in the image, and then edge thinning and edge following are applied in order to extract and link a meaningful closed contour of an object.

The region formation approach, sometimes called region growing, is a process which starts at a pixel and grows a region around it by grouping all neighboring pixels that possess a similar property. This is similar to, but differs from clustering in that region growing groups contiguous pixels directly on the image plane as opposed to grouping features in the feature space and then mapping them back to the original image plane. Connected regions can be formed of equal gray level intensity.

Image segmentation means 18 produces a binary control signal for switching means 20, such as a multiplexer or an AND gate circuit. Depending upon the state of the control signal, the threshold level $C_i$ is selected in sequential order from matrix 14 or matrix 16, which are two-dimensional matrix values defined to be the halftone cell threshold set. The series of threshold values and their arrangement within the threshold set determine the gray scale range, frequency, angle, and other properties of the halftone pictorial image. Each threshold level $C_i$ is determined by a comparison j×k matrix. When the input signal $X_i$ exceeds the threshold level $C_i$, the corresponding sub-element output $O_i$ is determined to have a print level (logic level "ONE"). A density pattern consisting of a combination of j×k sub-elements is obtained by dividing each picture element into j×k sub-elements and systematically printing them or leaving them blank.

While one aspect of the present invention involves segmentation of the image by optical density regions so as to print high optical density regions of the image at a high screen frequency and low optical density regions of the image at a low screen frequency, it is recognized that the abrupt change from one screen frequency to another might be noticeable. Accordingly, the present invention also encompasses choosing screen frequencies other than solely on the basis of optical density of the image. For example, the selection between high and low screen frequency matrices 14 and 16 may be made also on the basis of the busyness, segment size, and propensity to contouring of the segments.

Figure 5:
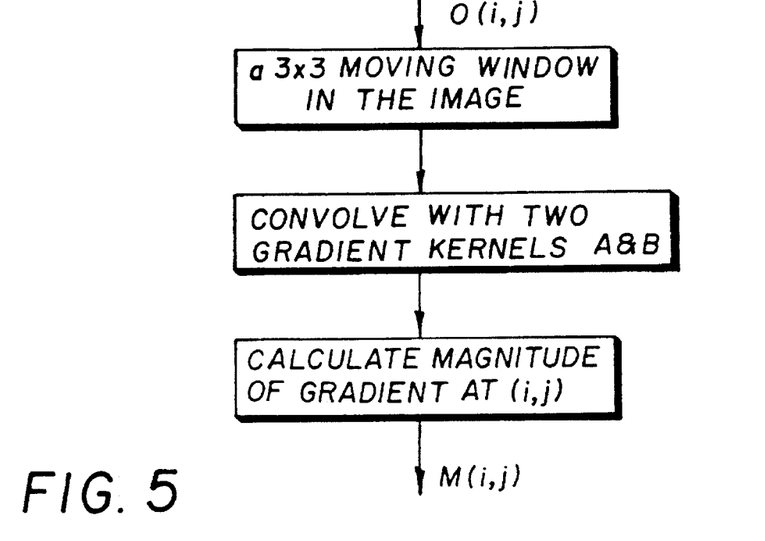
FIG. 5 is a logic flow chart of an example of a segmentation process usable with the present invention.
Figure 6A:
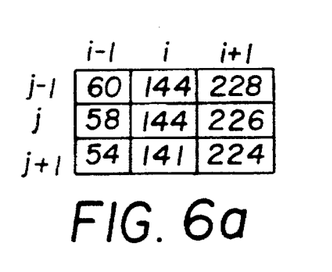
FIG. 6a is a illustration of a typical image bitmap of the segmentation process example of FIG. 5.
Figure 6B:
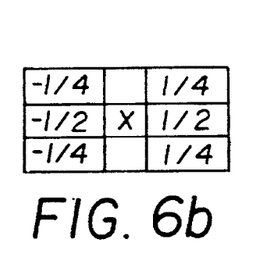
FIGS. 6b and 6c are respectively x-direction and y-direction gradient kernels usable in calculation of an image strength gradient of the segmentation process example of FIG. 5.
Figure 6C:
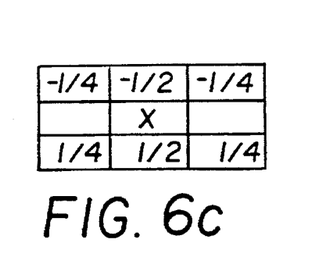

The following is an example of one illustrative process for segmenting an image from an original image bitmap O(i,j). First, an image gradient strength map M(i,j) is calculated from the original image bitmap O(i,j) as shown in FIG. 5. A 3 pixel by 3 pixel moving window of the original image bit map O(i,j), for example the 3×3 window of FIG. 6a, is convolved with an x-gradient kernel shown in FIG. 6b and a y-gradient kernel shown in FIG. 6c. Then the magnitude and direction codes are determined.

In the illustrated example, the calculations of the pixel at position (i,j) are:

$$\begin{aligned}\text{x-gradient} &= ((228 + 2*226 + 224) - (60 + 2*58 + 54))/4 \\ &= 168.5 \\ \text{y-gradient} &= ((54 + 2*141 + 224) - (60 + 2*144 + 228))/4 \\ &= -4\end{aligned}$$

Accordingly, the image strength gradient at (i,j) is $168.5 x + (-4)y$. The magnitude of the gradient at (i,j) is $((168.5)^2 + (4)^2)^{1/2}$ which is equal to 168.55. The direction of the gradient at (i,j) is the $\tan^{-1}(-4/168.5)$.

Figure 7:
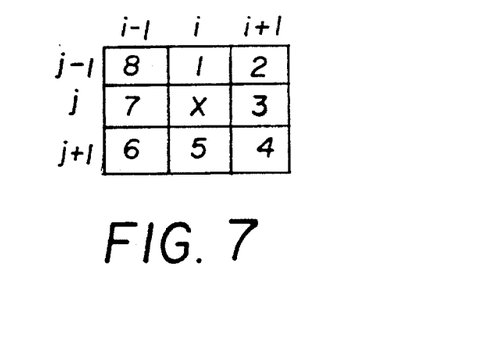
FIG. 7 is a direction code definition of the segmentation process example of FIG. 5.

Direction code is defined as a number one through eight as shown in FIG. 7. Accordingly, the gradient for the illustrated example at (i,j) has a magnitude 168.55 and a direction code three.

Similar calculations are applied to other image pixels in the image, and a magnitude feature map and associated direction feature map of the image are obtained.

Figure 8:
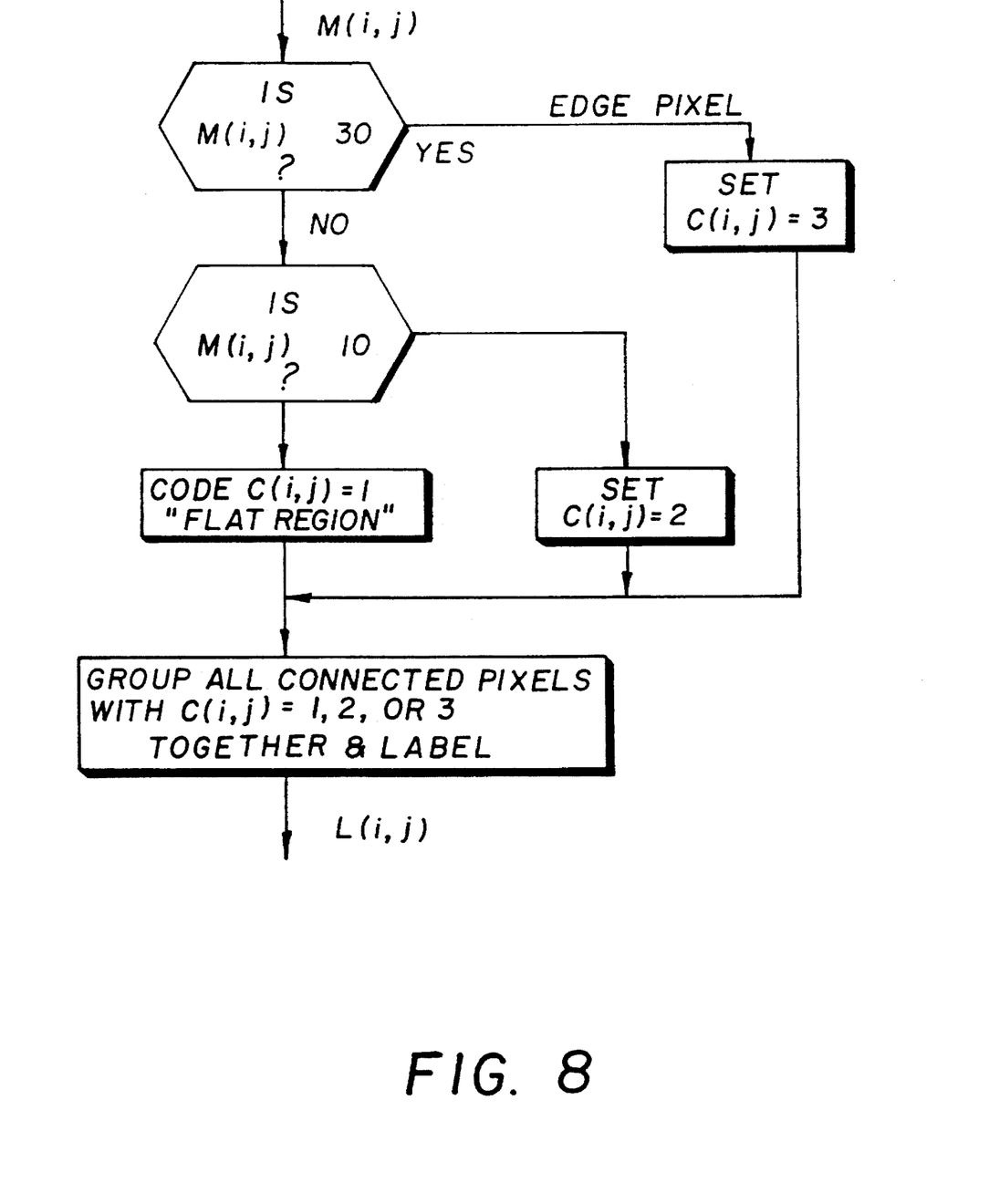
FIG. 8 is another logic flow chart for the example of a segmentation process of FIG. 5.
Figure 9:
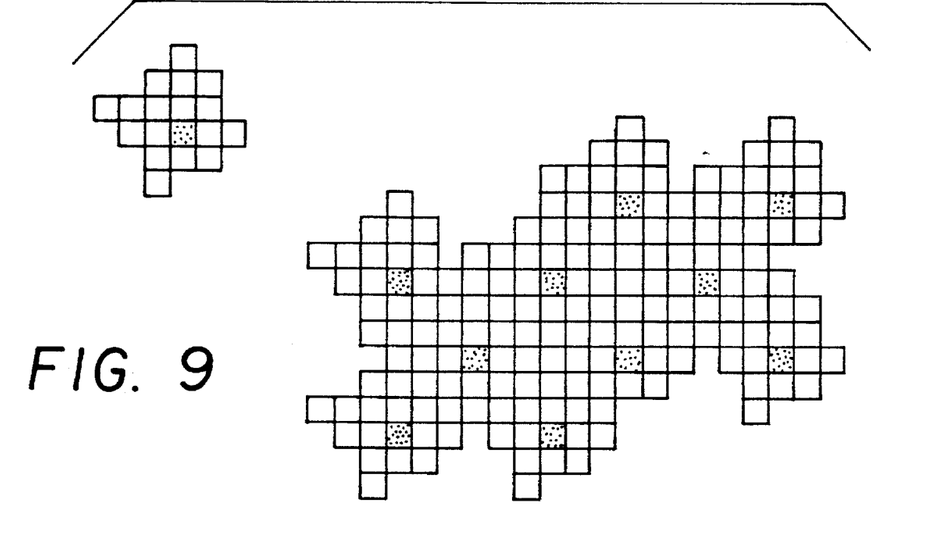
FIG. 9 illustrates an individual screen cell and a screen pattern having a 45 degree angle and 95 lines to the inch screen frequency (assuming that each box is 1/400 inches.
Figure 10:
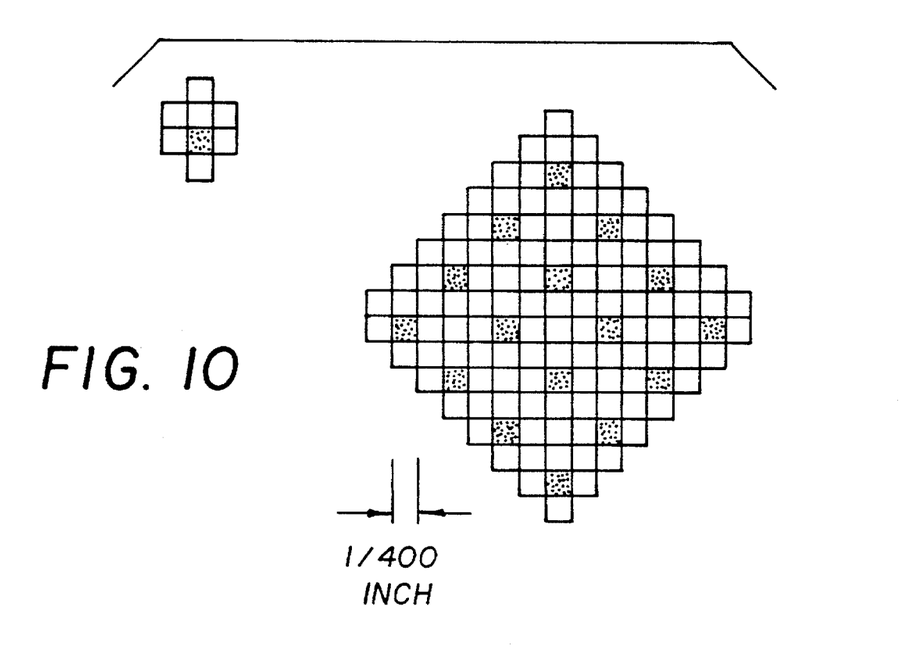
FIG. 10 illustrates an individual screen pattern having 141 lines to the inch screen frequency.

Now, each pixel is classified into one of three classes from the gradient strength map according to FIG. 8 to form a pixel classification map C(i,j). Class 3 is for pixels of high gradient strength, Class 2 is for pixels of medium gradient strength, and Class 1 is for pixels of low gradient strength.

Also shown in FIG. 8 is the step of grouping contiguous pixels which have the same gradient strength class together into distinct regions. Several regions are typically formed, each region having its own identity code.

The statistics of each region (such as for example the number of pixels, average intensity, average gradient strength, variance of the region, and color of the region) is calculated, and the regions are represented as the inside body of the segmenting objects. Where appropriate, each region is grown by collecting those border pixels which are coded "2" or "3", or by reassigning those pixels with "2" or "3" codes into neighboring regions. Small regions may be merged into surrounding larger regions.

Each resulting region is evaluated and rendered with an appropriate screen. For example, if a region is not "busy," its size sufficient, and its average intensity is greater than a predetermined threshold, then a lower frequency screen will be applied to this region. Otherwise, the region will be rendered by another screen. That is, "busy" regions will be rendered by higher frequency screens.

The invention has been described in detail with particular reference to preferred embodiments thereof, but it will be understood that variations and modifications can be effected within the spirit and scope of the invention. For example, the segmentation technique set forth herein is presented as an illustrative example, and other well known techniques are available in practicing the present invention.

What is claimed is:

1. Apparatus for producing a screened halftone image of continuous tone original images, said apparatus comprising:

means for producing a series of input signals whose values are representative of the gray levels of successive picture elements of an original image;

means for examining each pixel for an image characteristic and (1) means for classifying pixels by said image characteristic and (2) means for grouping pixels having the same classification to form segmented regions: and means for printing groups of sub-elements sequentially organized into two dimensional matrix halftone cells, each halftone cell being associated with one of said input signals; said printing means being adapted to print halftone cells associated with one of said segmented regions at a first screen frequency and to print halftone cells associated with another of said segmented regions at a second screen frequency higher than said first screen frequency.

2. Apparatus as set forth in claim 1 wherein said segmenting means is adapted to segment the original image into regions of different optical densities.

3. Apparatus as set forth in claim 1 wherein said segmenting means is adapted to segment the original image into regions of different optical densities such that the optical density of said one segmented region is lower than the optical density of said other segmented region.

4. Apparatus as set forth in claim 1 wherein said segmenting means is adapted to segment the original image into regions of different image busyness.

5. Apparatus as set forth in claim 1 wherein said segmenting means is adapted to segment busyness such that said one segmented region is less busy than said other segmented region.

6. Apparatus as set forth in claim 1 wherein said segmenting means is adapted to segment the original image into regions of different image propensity to countouring.

7. Apparatus as set forth in claim 1 wherein said segmenting means is adapted to segment the original image into regions of different image propensity to countouring such that said one segmented region includes image regions having a greater propensity to contouring than image regions included in said other segmented region.

8. Apparatus as set forth in claim 1 wherein said segmenting means is adapted to include segments below a predetermined size in the surrounding segment.

9. Apparatus for producing a screened halftone image of continuous-tone original images, said apparatus comprising:

means for producing a series of input signals whose values are representative of the gray levels of successive picture elements of an original image;

means for segmenting the original image into at least two regions of different image characteristics, said segmenting means including means for examining each pixel for an image characteristic and (1) means for classifying pixels by said image characteristic and (2) means for grouping pixels having the same classification to form a region;

means for printing groups of sub-elements sequentially organized into two dimensional matrix halftone cells which have substantially the same apparent screen angle, each halftone cell being associated with one of said input signals; said printing means being adapted to print halftone cells associated with one of said segmented regions at a first screen frequency and to print halftone cells associated with the other of said segmented regions at a second screen frequency higher than said first screen frequency.

10. Apparatus as set forth in claim 9 wherein said segmenting means is adapted to segment the original image into regions of different optical densities.

11. Apparatus as set forth in claim 9 wherein said segmenting means is adapted to segment the original image into regions of different optical densities such that the optical density of said one segmented region is lower than the optical density of said other segmented region.

12. Apparatus as set forth in claim 9 wherein said segmenting means is adapted to segment the original image into regions of different image busyness.

13. Apparatus as set forth in claim 9 wherein said segmenting means is adapted to segment the original image into regions of different image propensity to countouring.

14. Apparatus as set forth in claim 9 wherein said segmenting means is adapted to include segments below a predetermined size in the surrounding segment.

15. A method for producing a screened halftone image of continuous-tone original images, said method comprising the steps of:

generating a series of input signals whose values are representative of the grey levels of successive picture elements of an original image;

segmenting the original image into at least two regions of different image characteristics, said step of segmenting including examining each pixel for an image characteristic and (1) classifying pixels by said image characteristic and (2) grouping pixels having the same classification to form a region;

printing groups of sub-elements sequentially organized into two dimensional matrix halftone cells, each halftone cell being associated with one of said input signals and wherein halftone cells associated with one of said segmented regions are printed at a first screen frequency and halftone cells associated with the other of said segmented regions are printed at a second screen frequency higher than said first screen frequency.

16. The method of claim 15 and wherein in said segmentation step, the grey level of each picture element and the grey levels of picture elements contiguous with said each picture element are used to calculate an image gradient strength for said each picture element, each picture element is classified in accordance with a category of image gradient strength and groups of contiguous pixels of similar gradient strengths are grouped together into distinct regions which have their own identity codes.

17. The method of claim 16 and wherein a region is examined to determine if it is a busy region and the size of the region is examined and its average intensity compared with a threshold and in response to the examination for being busy and size and average intensity a decision is made to print the region with a predetermined screen frequency.

18. The method of claim 16 and wherein small regions are merged into surrounding larger regions and each resulting region is evaluated to determine a screen frequency for recording the pixels in the region.

19. The method of claim 17 and wherein a region classified as not busy is rendered in a lower frequency screen pattern.

20. The method of claim 15 and wherein the halftone cells each have substantially the same screen angle.

21. The method of claim 16 and wherein the halftone cells each have substantially the same screen angle.

22. The method of claim 15 and wherein the grey level value of each pixel of the original image is examined and determined to be within an identified brightness range if between two threshold values and wherein pixels within the same identified brightness range are clustered into the same region to segment the image.

23. The method of claim 22 and wherein edge detection is used to determine an outline in an image during the segmenting step.

24. The method of claim 15 and wherein a property of each pixel of the original image is examined and neighboring pixels that possess a similar property are grouped with said each pixel to grow a region.

* * * * *